United States Patent [19]

Remmers

[11] Patent Number: 5,184,080
[45] Date of Patent: Feb. 2, 1993

[54] TEST APPARATUS FOR OPTO-ELECTRONIC TIME BASED GENERATOR OF AN IGNITION SYSTEM

[75] Inventor: Gregry M. Remmers, Ingleside, Ill.

[73] Assignee: Outboard Marine Corporation, Waukegan, Ill.

[21] Appl. No.: 608,541

[22] Filed: Nov. 2, 1990

[51] Int. Cl.⁵ ............................................. F02P 17/00
[52] U.S. Cl. .................................... 324/392; 324/385; 123/414; 123/613
[58] Field of Search ............... 324/385, 391, 392, 175; 123/414, 613

[56] References Cited

U.S. PATENT DOCUMENTS

| | | | |
|---|---|---|---|
| 3,866,120 | 2/1975 | Ford | 324/175 |
| 4,445,087 | 4/1984 | Mehnert | 324/175 |
| 4,494,518 | 1/1985 | Katayama et al. | 123/414 X |
| 4,553,426 | 11/1985 | Capurka | 123/414 X |
| 4,656,993 | 4/1987 | Yuzawa et al. | 123/414 X |
| 4,766,865 | 8/1988 | Härtel | 123/414 |
| 4,858,585 | 8/1989 | Remmers | 123/602 |

Primary Examiner—Jack B. Harvey
Assistant Examiner—Glenn W. Brown
Attorney, Agent, or Firm—Welsh & Katz, Ltd.

[57] ABSTRACT

A test and maintenance method and apparatus for an ignition system of an internal combustion engine, such as an outboard marine engine, which includes an advanced timing schedule, a nonadvanced timing schedule, and a circuit for switching between the two schedules or disabling both schedules based upon engine operating conditions. The ignition system includes an opto-electronic time base generator which produces two sets of timing pulses relative to crankshaft position which are nonadvanced timing pulses and advanced timing pulses. The time base generator comprises two LED phototransistor pairs and an encoder disk attached to the crankshaft with slots to interrupt the radiation path between each LED-phototransistor pair. The encoder disk is provided with a synchronizing slot, multiple timing slots associated with the cylinders of the engine, and a direction slot. The test function of the apparatus verifies the timing and sequence of timing pulses. The maintenance function of the apparatus provides a visual indication of reference locations such that the engine may be timed statically.

2 Claims, 4 Drawing Sheets

TEST APPARATUS FOR OPTO-ELECTRONIC TIME BASED GENERATOR OF AN IGNITION SYSTEM

FIELD OF THE INVENTION

The present invention pertains generally to electronic ignition systems for internal combustion engines, such as an outboard marine engine or the like, and is more particularly directed to a test method and apparatus for an opto-electronic time base generator of this type of ignition system.

BACKGROUND OF THE INVENTION

Previously, outboard marine engines have often utilized various mechanical means for accomplishing easier starting. For example, these engines may engage a "warm-up" lever which manually advances the ignition timing and partially opens the carburetor throttle plate. The function of such arrangement is to increase the idle speed and the air/fuel ratio of the engine when it is started. These conditions allow the engine to start easier and run more smoothly until it has warmed up to its standard operating temperature.

More recently, electronic ignition systems have been provided on outboard marine engines. A multi-variable ignition system for outboard marine engines or the like, which selectively adapts ignition scheduling for a number of conditions is illustrated in U.S. Pat. No. 4,858,585, entitled, "Electronically Assisted Engine Starting Means" by Gregry M. Remmers, which was filed on Dec. 11, 1987, and which is assigned to the assignee of the present invention.

A dual schedule ignition system including the advantages of the system disclosed in the '585 Remmers patent and disclosing, inter alia, a novel and improved opto-electronic time base generator and distributor system is described in U.S. continuation-in-part application, Ser. No. 315,147, entitled "Dual Schedule Ignition System" by Gregry M. Remmers, which was filed on Feb. 24, 1989 and which is assigned to the same assignee as the present invention.

An improved ignition system, having a protection system to prevent reverse engine operation is described in a U.S. application Ser. No. 527,556, entitled "System to Prevent Reverse Engine operation", by Gregry M. Remmers, which was filed on May 23, 1990 and which is assigned to the same assignee as the present invention.

The disclosures of Remmers (U.S. Pat. No. 4,858,585), (Ser. No. 315,147) and (Ser. No. 527,556) are hereby expressly incorporated by reference herein.

The opto-electronic time base generator of Remmers (Ser. No. 315,147) is implemented by having an encoder disk with timing features rotated synchronously with the engine crankshaft past an illumination source which is optically coupled to a photo sensitive element. The timing features are positioned on the disk such that each feature is a predetermined number of degrees of engine rotation in duration. A digital waveform is generated indicating the presence or absence of a particular feature and two pulse trains are derived from each pulse of the waveform, where the first is indicative of the leading edge of the feature and the second is indicative of the trailing edge of the feature.

When the encoder disk is rotated in synchronism with the engine crankshaft, the two trains of pulses form a time base where one pulse train is advanced relative to the second pulse train by the duration of each timing feature. The timing of the pulse trains relative to actual crankshaft position is varied by movement of the illumination source and photo-sensitive element relative to the encoder disk and is scheduled based upon various engine operating parameters.

The first train of pulses provides an advanced ignition timing schedule while the second train of pulses provides a nonadvanced ignition timing schedule. An electrical pulse generator and distributor receives the two pulse trains and selects between the two timing schedules based upon receiving an advance signal or a nonadvance signal. Both schedules are inhibited by an inhibit signal. The selected pulse schedule is distributed to the correct cylinders in the firing sequence of the engine to ignite the engine. A control circuit generates the advance, nonadvance, and inhibit signals based upon time, engine temperature, and starting condition.

The time base generator of Remmers (Ser. No. 527,556) further includes a direction feature which is a predetermined number of degrees of engine rotation in duration. The direction feature is located between the timing features for the last cylinder and the first cylinder, and overlaps the synchronizing feature on the encoder disk.

While the aforementioned opto-electronic time base generators are advantageous in use, there are presently a lack of facile methods and apparatus for maintaining them and testing their operabilities. The timing, synchronizing, or direction features may become blocked by dirt or other foreign materials so that the time base signals are adversely affected. Further, the light emitting diodes, the photo-transistors, and other circuits can develop intermittent faults, or wear out totally. It is relatively difficult without a costly dismantling of the encoder and associated circuitry to determine whether these components are working properly or, if there is a problem, to determine whether it originates in the time base generator or the general ignition circuitry. Therefore, it would be highly advantageous if an effective test apparatus could be devised to determine the operability of the time base generator independently of the ignition circuitry.

Because of the opto-electronic time base generator and the capacitive discharge circuitry, ignition systems of this type are timed somewhat differently than normal ignition systems. However, the standard timing light method which strobes on the firing of a particular cylinder to illuminate a reference mark on the crankshaft is still used. This requires that the engine be started and operating, which for an outboard marine engine usually means dismounting it from its watercraft and remounting it on an engine stand. Thus, it would be highly advantageous to devise a maintenance apparatus which would permit the static (nonoperational) timing of the ignition system of an outboard marine engine without the dismounting of the engine from the watercraft.

SUMMARY OF THE INVENTION

Accordingly, it is an object of the invention to provide a novel test apparatus for an electronic ignition system of an internal combustion engine.

Still another object of the invention is to provide an improved test apparatus for an ignition system which includes an advanced timing schedule, a nonadvanced timing schedule, and a means for switching between the two schedules or inhibiting both schedules.

Yet another object of the invention is to provide a maintenance apparatus to provide the static timing of an electronic ignition system.

Accordingly, the invention provides a test and maintenance apparatus for an opto-electronic time base generator of an electronic ignition system for internal combustion engines, such as outboard marine engines or the like.

In a preferred embodiment, the test and maintenance apparatus is particularly adapted for an ignition system which includes an opto-electronic time base generator providing a first train of pulses advanced in time from a second train of pulses. An implementation of the opto-electronic time base generator includes an encoder disk with timing features rotated synchronously with the engine crankshaft past an illumination source which is optically coupled to a photo-sensitive element. The timing features are positioned on the disk such that each feature is a predetermined number of degrees of engine rotation in duration. A digital wave form is generated indicating the presence or absence of a particular feature and the two pulse trains are derived from each pulse of the waveform, where the first is indicative of the leading edge of the feature and the second is indicative of the trailing edge of the feature. An independent synchronizing or reference feature provides a second digital wave form derived from a second illuminating source and photo-sensitive element to determine the relative relationship of the timing features to a predetermined location on the crankshaft for each rotation. A direction feature is additionally provided to permit the detection of the direction of the rotation of the engine.

An electrical pulse generator and distributor receives the two pulse trains and selects between the two based upon receiving an advance signal or a nonadvanced signal based at least one operating parameter of the engine. Both schedules are inhibited by an inhibit signal. The selected pulse schedule is distributed to the correct cylinders in the firing sequence of the engine to ignite the engine. Preferably, a control circuit generates the advance, nonadvanced, and inhibit signals based upon time, engine temperature, direction of engine rotation, and engine starting condition.

The invention provides as one feature a test apparatus which determines whether all of the timing, sync, and directional features of the encoder disc and associated circuitry are correctly generating the pulse signals for the time base. Preferably, if the time base generator is working properly, a visual indicator in the form of an LED is lighted to alert the test technicians of this condition. Alternatively, if the time base generator is not working, another visual indicator in the form of a second LED is lighted to alert of this condition.

The test apparatus includes a connector mateable with the connector of the time base generator. The time base generator can then be disconnected, and thus isolated from the remaining ignition circuitry while the test apparatus performs the test. The test apparatus includes an independent power supply for the time base generator which allows complete isolation from the rest of the ignition circuit and permits the test to be done without the engine running.

The test apparatus includes leads for connecting the apparatus to the time base pulses of the generator. The apparatus receives the pulses and applies them to logic means which counts the number and sequence of the pulses and, depending upon the results, provides logic signals which enable the visual indicators to show the technician the test results. Preferably, the logic means comprises two counters, including a sync pulse counter and a timing pulse counter. The sync pulse counter enables the timing pulse counter upon the receipt of a sync pulse and permits it to count the timing pulses which occur until the next sync pulse.

At this next sync pulse, one of the visual indicators is enabled to indicate whether the count was accurate or not. The next sync pulse advances the sync counter to reset the logic means so that the process can be repeated.

The invention provides as another feature a maintenance apparatus and method for statically determining the timing of the engine. An outboard marine engine can be timed substantially accurately by this method without the removal of the engine from the watercraft. The maintenance feature includes means to visually indicate the sync and timing pulses when the engine is rotated manually. The visual indicators provide a technician with the knowledge of the crankshaft position with respect to a reference. A stop on the timing ring of the time base generator is then set to determine a predetermined static timing point.

BRIEF DESCRIPTION OF THE DRAWINGS

These and other objects, features, and aspects of the invention will be better understood and more fully described upon reading the following detailed description in conjunction with the appended drawings wherein.

DETAILED DESCRIPTION OF THE PREFERRED EMBODIMENT

Figures 1, 2:
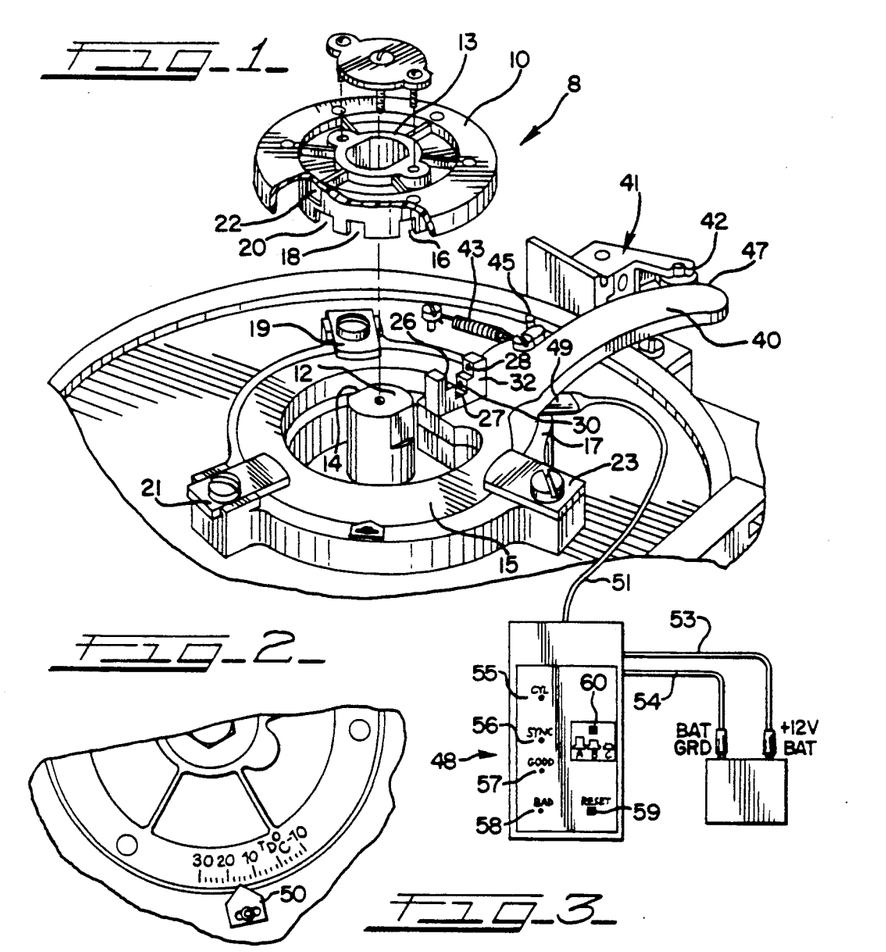
FIG. 1 is a partially-broken, pictorial perspective view of an internal combustion engine of the outboard marine type illustrating a test and maintenance apparatus constructed in accordance with the invention which is attached to the time base generator of an ignition system.
FIG. 2 is a partially broken top view of the time base generator encoder disc illustrated in FIG. 1 showing the timing indicia used to statically time the engine.

A time base generator 8 of an electronic ignition system is shown in FIG. 1 where a mechanism for the generation of two timing characteristics or pulse trains is illustrated. The time base generator 8 includes a generally cylindrically shaped encoder disk 10 which is bolted onto a shaft extension 12 of the crankshaft of an internal combustion engine so as to cause the disk to rotate synchronously therewith. The crankshaft extension 12 includes two notches 14 which are received in a reciprocally shaped hub 13 of the encoder disk 10. The notches 14 position the encoder disk 10 and a number of timing features 16, 18, and 20 located thereon at a known crankshaft position, i.e., at an angle relative to top dead center of a particular cylinder, for example, cylinder 1. As shown in FIG. 2, to assist in timing the engine, this reference point 0° can be inscribed on the encoder disk 10 so that it can be aligned with a stationary marker 50 on the engine casing by the common strobe light technique. Rotation of the crankshaft is clockwise when viewed from the top (front) of the engine, as is conventional with many internal combustion engines.

The encoder disk 10 has an encoding portion with the several timing features 16, 18, and 20 located at spaced positions around its periphery. The timing features in the illustrated implementation are provided as slots 16 and 18, although many other geometric features would suffice. In the preferred embodiment, the number of timing slots is equal to the number of cylinders of the engine and they are equally spaced around the periphery of the encoder disk 10. For a six-cylinder, two cycle engine this means six equally spaced slots at 60 intervals.

Each of the slots 16 and 18 has a width which is a particular angular rotation of the crankshaft, and which in the preferred implementation is 15°. The encoder disk 10 further includes a synchronizing portion having a synchronizing feature, slot 22, to indicate the relative position of the disk 10 with respect to overall crankshaft position, thus associating each timing slot 16 and 18 with a particular cylinder. In the illustration, slot 22 is placed in advance of cylinder 1, top dead center, and slots 18 and 16 thereby correspond to cylinders 1 and 2, respectively. In addition, a direction feature, slot 20, is located between two cylinder timing features in an overlapping relationship with the synchronizing feature 22. The direction feature 20 is used in conjunction with the synchronizing feature 22 to determine the direction of engine rotation as will be more fully explained hereinafter.

The timing features of the encoder disk 10 make and break an optical illumination path between LEDs 26, 27 and two corresponding phototransistors 28 and 30 which are mounted in an optical-coupler block 32. The optical-coupler block 32 is mounted on a timing ring 15 which slidably rotates on the shoulder of a raised boss 17 of the engine. Spring clips 19, 21, 23 retain the ring 15 in the boss 17 without preventing its rotation. An extension arm 40 of the timing ring 15 is used to rotate the ring and, thus the optical-coupler block 32 with respect to the fixed relationship of the encoder disk 10 and the crankshaft.

Normally, the ring 15 is biased to a setable position by spring 43 where it abuts an adjustable stop 45. An ignition advance assembly 41 including a roller 42 can be used to apply force against a cam surface 47 of the arm 40 in order to rotate the optical-coupler block 32 in dependence upon a plurality of engine operating conditions to schedule ignition timing. Such engine operating conditions can be such things as speed, air flow, water or engine temperature, humidity, manifold pressure, altitude, throttle position, etc.

It is evident that during the rotation of the encoder disk 10 by the crankshaft, illuminating radiation from the LED 27 to the phototransistor 30 is normally blocked until a slot, for example, the one indicated as 18, rotates between the LED and the phototransistor. At this time, the optical transmission path is open and the phototransistor 30 conducts current producing an electrical signal indicating the presence of the slot. During this time the optical transmission path between LED 26 and the upper phototransistor 28 is blocked by the encoder casing. However, during those times when the slot 22 rotates into a position between the LED 26 and the phototransistor 28, the open transmission path causes phototransistor 28 to conduct current and produce an electrical signal indicating the presence of the synchronizing slot 22 at the position of the optical-coupler block 32. Because the synchronizing slot 22 overlaps with the direction slot 20, the phototransistors 28, 30 will both conduct current during this time.

Figure 3:
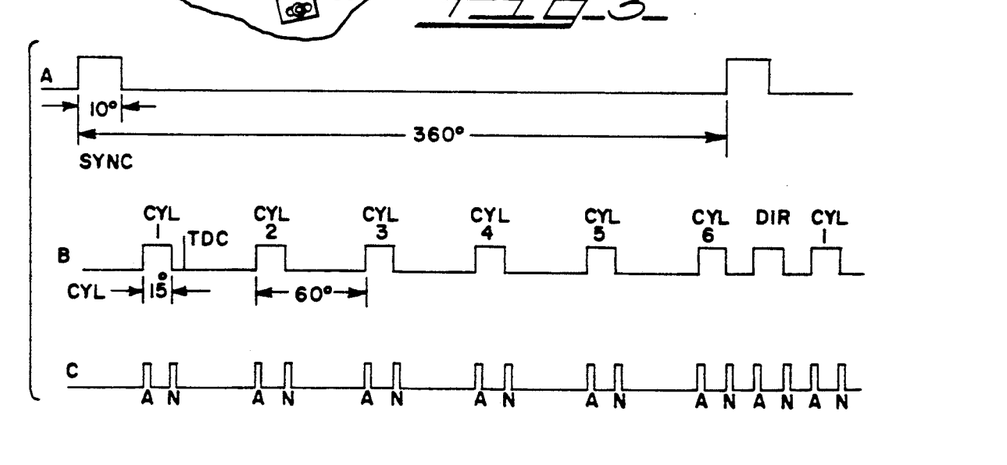
FIGS. 3A-3C are pictorial representations of various timing waveforms output from the time base generator illustrated in FIG. 1 and the pulse generator and distributor illustrated in FIG. 4.

In general, the timing signals generated from the time base generator 8 are shown in FIGS. 3A-3C. The first signal is a SYNC signal (FIG. 3A) from slot 22 which is approximately 10° in duration and occurs once for every 360° of engine crankshaft rotation. The leading edge of the SYNC signal occurs some advancement before top dead center of a particular cylinder, in the illustrated example, cylinder 1. From this leading edge reference point, all other timing pulses and signals for the system can be measured. In general, the SYNC signal is used to reset the distribution sequence of the ignition pulses. The second timing signal, CYL, is a group of pulses forming a digital waveform which is generated from the encoder slots 16, 18, and 20, etc. (shown in FIG. 3B). There is a pulse, CYL1-CYL6, respectively, for each cylinder of the engine. The pulses are 15° of engine rotation in duration and separated by equal angular increments of the crankshaft at 60° intervals. Between the CYL1 and CYL6 pulses and overlapped in time with the SYNC pulse is the direction pulse DIR generated from direction slot 20.

Figure 4:
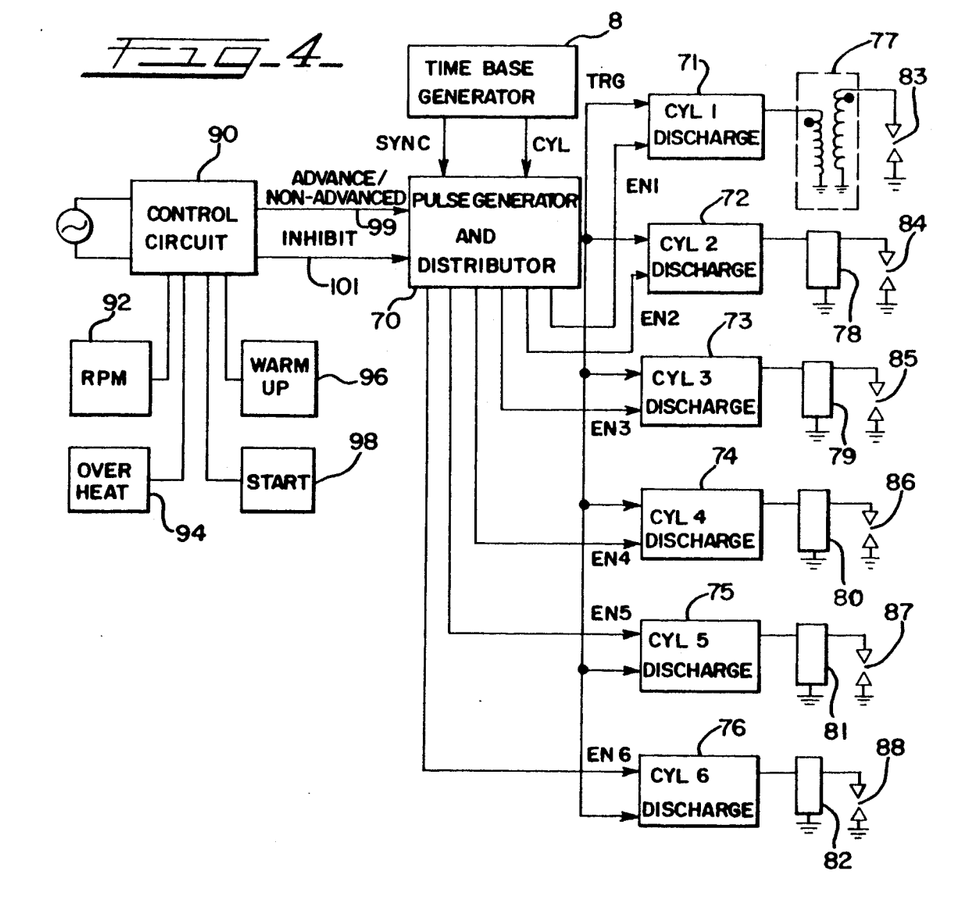
FIG. 4 is a system block diagram of the ignition system illustrated in FIG. 1.

From the pulses of FIG. 3B, two sets of trigger pulses, as shown in FIG. 3C, are generated by the pulse generator and distributor 70 of FIG. 4. The leading edge of each cylinder or direction pulse, CYL1-CYL6, DIR, is used to generate one train of advanced pulses A, and the trailing edge of each cylinder or direction pulse is used to generate a second train of nonadvanced pulses N. The advanced pulse train A is used in an advanced timing schedule and the nonadvanced pulse train N is used for a nonadvanced timing schedule.

The nonadvanced pulses at idle occur substantially at top dead center of each associated cylinder, while the advanced pulses are advanced over the nonadvanced pulses a predetermined increment, 15°. It is seen that the width of the encoder slots 16, 18 determines the predetermined advancement of the advanced schedule over the nonadvanced schedule. Further, the position of the optical-coupler block 32 relative to the fixed relationship of the encoder disk 10 and crankshaft determines the variance of timing with respect to engine operating variables and, thus the actual timing schedule.

A test and maintenance apparatus 48 for verifying the signals from the time base generator 8 of the ignition system is shown connected through a connector 49 and a cable harness 51 to the rear of the timing ring 15. The connector 49 fits into a connector socket normally used to connect the ignition system circuitry to the time base generator interface circuitry. This provides an advantageous method of connecting the test apparatus while additionally isolating the time base generator from the ignition circuitry. Two clip leads 53, 54 are connected to an independent power source, such as the engine battery.

Figure 5:
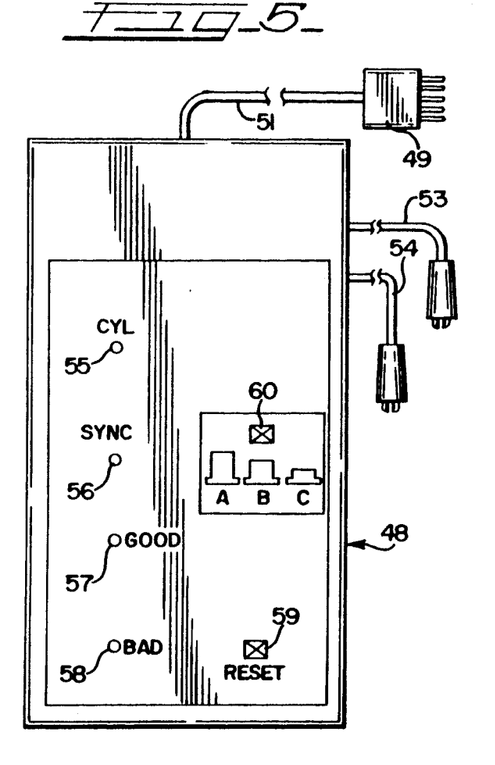
FIG. 5 is a pictorial representation of the front panel controls and indicators of the test and maintenance apparatus illustrated in, FIG. 1.

The test and maintenance apparatus 48 front panel is shown in FIG. 5 in additional detail. The face of the panel has four visual indicating means, illustrated as a "CYL" LED (light emitting diode) 55, a "SYNC" LED 56, a "GOOD" LED 57, and a "BAD" LED 58. On the other side of the panel are located two control switches which are used to operate the test device. A reset switch 59 is implemented as a spring loaded push button. A position switch 60 allows personnel to select positions A, B, or C by pushing in a button having corresponding stops. Switch 59 is for resetting the circuitry in the test apparatus to initiate a test while switch 59 selects the model of the engine (number of cylinders) wherein position A is for a four cylinder engine, position B is for a six cylinder engine, and position C is for an eight cylinder engine.

An electronic ignition system, associated with the time base generator 8 illustrated in FIGS. 1 and 2, is more fully shown in the block diagram with reference to FIG. 4. The ignition system includes a pulse generator and distributor 70 which produces trigger pulses TRG to a number of capacitive discharge circuits 71-76, wherein each capacitive discharge circuit is associated with a particular cylinder. When enabled from the pulse generator and distributor 70 by individual enable lines, EN1-EN6, a trigger pulse TRG will cause the capacitive discharge circuits, 71-76, to provide a high current, low voltage pulses of approximately 300V through the primaries of step-up transformers, 77-82, respectively. The step-up transformers, 77-82, step up the voltage of the current pulses from the capacitive discharge circuits into high tension pulses which fire spark plugs, 83-88, respectively, of associated cylinders of the engine. The spark plugs, 83-88, are ignited sequentially in the firing order of the engine by their respective connection in that order relative to the sequence of firings of the capacitive discharge circuits.

The time base generator 8 is shown generating the pulse trains SYNC and CYL to the pulse generator and distributor 70, which are the signals as shown in FIGS. 3A and 3B. The trigger pulses TRG which are derived from these signals by the pulse generator and distributor 70 are those shown in FIG. 3C. They are distributed by generating the enable signals EN1-EN6 based on crankshaft position and the firing order of the engine. Whether the trigger pulses TRG are the advanced schedule A or the nonadvanced schedule N, depends upon a control circuit 90.

The control circuit 90 determines, from the engine operating conditions including means for sensing RPM 92, means for sensing an overheat condition 94, means for sensing a warmup condition 96, and means for sensing a starting condition 98, whether the advanced timing schedule, the nonadvanced timing schedule, or no timing schedule should be used. This selection information is delivered to the pulse generator and distributor 70 via an ADVANCE/NONADVANCED signal on line 99. Alternatively, the control circuit 90 generates an INHIBIT signal on line 10 to completely stop any ignition pulses from being generated to the engine.

The advanced timing schedule is used during starting and warmup durations, while the nonadvanced timing schedule is used at all other times, except in those instances when both ignition schedules are inhibited. It is seen that there is always a +15° advance between the advanced schedule and the nonadvanced schedule which is dependent upon the spacing between pulse trains A and N from the time base generator 8. The spacing between the pulses is due to the slot widths of the optical encoder disk 10. The variation in advance angle as a function of engine operating parameters (schedule) is developed by the rotation of the optical coupler block 32 relative to the fixed position of the optical encoder disk 10 on the crankshaft. The control circuit 90 and its operation are more fully disclosed in FIG. 7 of the referenced application by Remmers, Ser. No. 315,147. Because the present invention uses this circuit in the same manner as that described in the prior application, a duplication of its description here has been omitted for the purpose of clarity.

Figure 6:
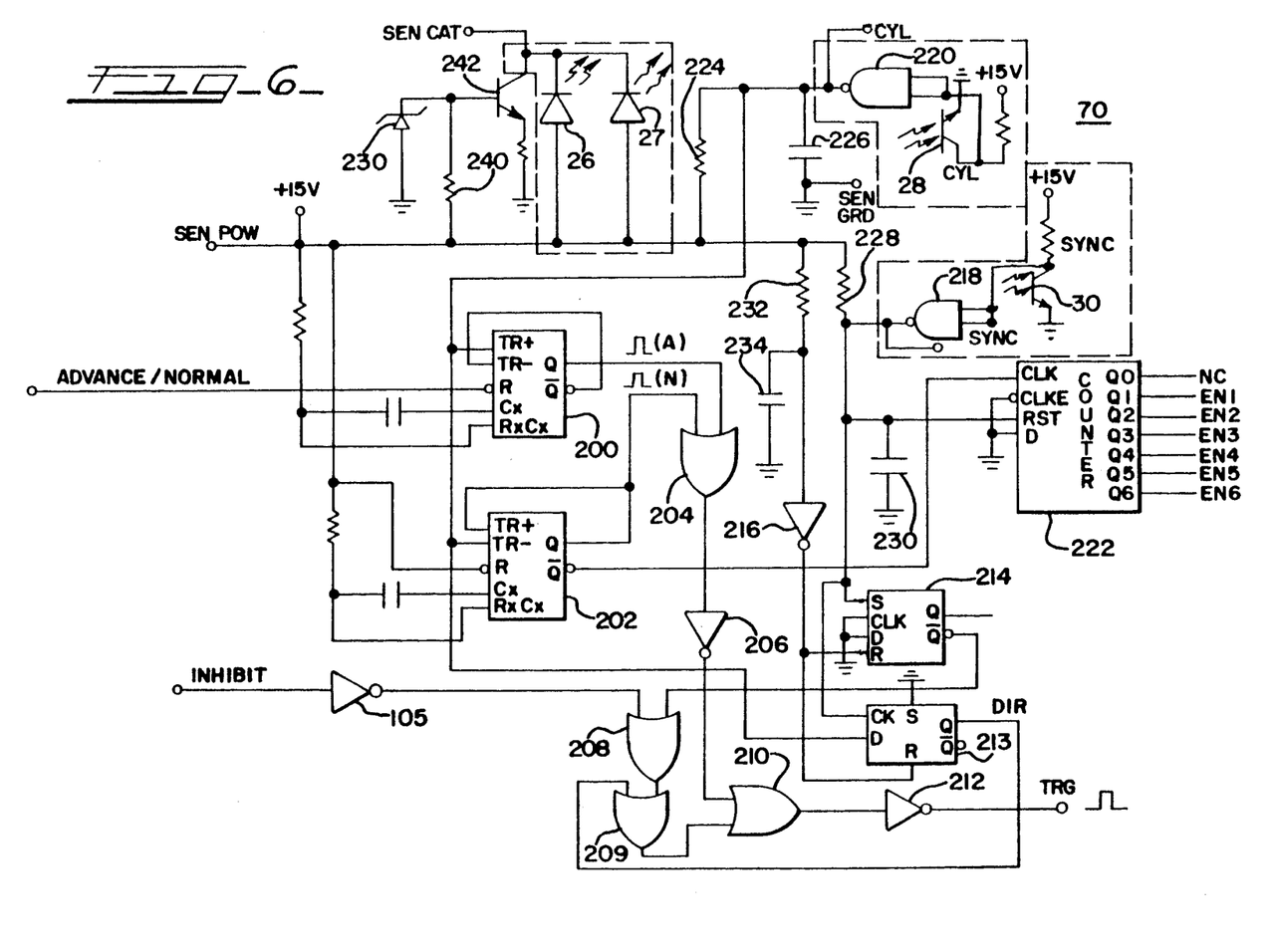
FIG. 6 is a detailed electrical schematic diagram of the pulse generator and distributor circuit illustrated in FIG. 4.

FIG. 6 illustrates the detailed electrical schematic of the pulse generator and distributor 70. In general, the pulse generator and distributor 70 performs four functions. Initially, it generates the advanced pulse train A and the nonadvanced pulse train N from the CYL wave form. Secondly, the circuit selects between the pulse train A and pulse train B, or inhibits both pulse trains, based on the input signals ADVANCE, NONADVANCED, and INHIBIT from the control circuit 90. A further function of the pulse generator and distributor 70 is to inhibit both pulse trains based on a detected reverse engine rotation using the SYNC and CYL waveforms. Additionally, the circuit generates the enabling signals, EN1-EN6, based on the SYNC wave form and the CYL waveform to distribute the selected pulse train as the TRG signal to the correct cylinders in the firing order of the engine.

The LEDs 26, 27 which are part of the time base generator 8 are shown as being always powered on by their connection in a conductive path between +15V, the emitter-collector path of NPN transistor 242, a resistor, and ground. The transistor 242 regulates the current flow through LEDs 26, 27 by having a predetermined bias voltage on its base. The bias voltage is generated by the combination of Zener diode 230 and resistor 240 connected between the +15V supply and ground. Phototransistors 28 and 30 which are part of the time base generator 8 generate the previously described signals CYL and SYNC when illuminated by LEDs 26, 27 during rotation of the encoder 10.

The pulse generator and distributor circuit 70 comprises basically two monostable multivibrators 200 and 202 and a synchronous sequential counter 222. Generally, the monostable 200 is configured to be triggered by the positive going edge of a pulse to its TR+ input. Application of an edge transition from a low logic level to a high logic level at input TR+ will produce a positive going pulse from its Q output which becomes the advanced pulse train A. Conversely, the monostable 202 is configured to produce a positive going pulse from its Q output when a negative going edge of a pulse is applied to its TR− input, which results in the nonadvanced pulse train N. Both the TR+ input of monostable 200 and the TR− input of monostable 200 are connected to the output of a NAND gate 220 which is configured as an inverter and driven by the CYL signal. The CYL signal is generated by the illumination of phototransistor 28 which is connected across both inputs of the NAND gate 220. The NAND gate 220 has an open collector output connected to the junction of a resistor 224 and a capacitor 226 which inverts the CYL signal, thus providing a positive going transition on the leading edge of the CYL signal and a negative going transition on the trailing edge of the CYL signal. The ADVANCE and NONADVANCED signals are a single signal, ADVANCE/NONADVANCED, which is applied to the negative true reset terminal R of monostable 200. The ADVANCE signal is the high logic level of the combined signal while the NONADVANCED signal is the low logic level.

With this circuit, two pulses are generated for each CYL or DIR signal pulse and form two pulse trains, one based on the leading edges of the CYL or DIR signals from monostable 200 and the other based on the trailing edges of the CYL or DIR signals from monostable 202. If the advanced pulses are selected, the ADVANCE/NONADVANCED signal is a high logic level and both pulse trains are transmitted to the cylinders. Because the ignition circuit is a capacitive discharge circuit, the nonadvanced pulses which follow the advanced pulses do not perform a retriggering of the ignition system as the ignition capacitance has not yet recharged. If the nonadvanced pulses are selected, the ADVANCE/NONADVANCED signal is a low logic level which holds monostable 200 reset so that only the nonadvanced pulse train is generated.

The first pulse train A and the second pulse train N are combined in a OR gate 204 before being inverted by inverter 206. The output of inverter 206 is fed through OR gate 210 and again inverted in inverter 212 before becoming the trigger signal TRG. The INHIBIT signal is provided through an inverter 105 and OR gate 208 and OR gate 209 to produce a disabling signal at OR gate 210 during its presence. When the INHIBIT signal is a low logic level, a high logic level disables OR gate 210 and both pulse trains.

Another inhibiting signal to OR gate 208 is provided by a D-type bistable multivibrator 214 which has its *Q output connected to one of the inputs of the gate. The reset input R of bistable 214 is connected to the output of inverter 216 whose input is connected to a power on reset resistor-capacitor combination connected between +15V and ground. The set terminal S of the bistable 214 is connected to the SYNC signal at the output of NAND gate 218. In operation, the bistable 214, which is reset on power up, normally disables the trigger pulses TRG until the first SYNC signal occurs. This is to prevent misfiring of the engine when initial engine rotation begins and the ignition system is not yet synchronous with the crankshaft. The capacitor 234 is generally charged up to +15V providing a normally low logic level on the reset input of the bistable 214. This produces a high logic level output from the *Q output and thus disables OR gate 210. When the first SYNC signal occurs, the bistable 214 is set removing the disabling signal from OR gates 208 and 210.

The operation of the direction logic means will now be more fully explained. Another inhibiting signal to OR gate 209 is provided by the Q output of a D-type bistable multivibrator 213. This inhibiting signal is the directional signal DIR which indicates by its logic level whether the engine is rotating in a forward or reverse direction. If the engine is rotating in the forward direction, the DIR signal is a low logic level and the output from OR gate 210 is enabled by a low logic level from OR gate 209. If the engine is rotating in the reverse direction, the DIR signal is a high logic level and pulses are inhibited from passing through OR gate 210 because of the high logic level output of OR gate 209.

The DIR signal is generated from the bistable 213 which has its clock input CK tied to the output of an inverter (NAND gate 218) which is the SYNC signal. The data input D of the bistable 213 is tied to the output of an inverter (NAND gate 220) which is the CYL signal. Normally, the CYL and SYNC pulses do not overlap (see FIG. 4) and the DIR signal remains at a low logic level. Only when the SYNC and CYL signals overlap during a direction pulse DIR is there a possibility of an inhibiting signal. If the engine is rotating in the forward direction, the leading edge of the SYNC signal (as seen in FIG. 4A) will clock the bistable 213. Because the DIR pulse has not yet occurred, a low logic level will be clocked into the Q output of the device and the ignition pulses will not be inhibited. Conversely, if the engine is rotating in the reverse direction, the rising edge of the SYNC signal will clock the bistable 213. Because the CYL pulse is a high logic level at this time, a high logic level is clocked into the Q output of the device and the ignition pulses will be inhibited.

The counter 222 generates the enabling signals EN1–EN6 sequentially from its Q1–Q6 outputs, respectively. The enabling signals EN1–EN6 are generated in sequence and then cycled in the same sequence. The SYNC signal caused by the illumination of phototransistor 30 is used to apply a high logic level to the reset input RST of the counter 222. The SYNC signal is inverted by NAND gate 218, resistor 228 and capacitor 230 in the same manner the CYL signal was inverted and causes the counter 222 to reset. The Q0 output of the counter 222 is left unconnected so that the system sequences past the direction pulse DIR. The end of the DIR pulse thereafter generates the EN1 signal thereby arming the respective capacitive discharge circuit associated therewith. The pulses A or N are then applied to the armed circuit firing the circuit in concert with its respective crankshaft position. After the trigger pulse has been applied, the trailing edge of the next CYL pulse through the *Q output of the monostable 202 clocks the counter 222 by application of the pulses to its CLK input. This advances the counter to the next enabling signal, EN2, and so on in the sequence as the cycle continues.

The capacitive discharge circuits 71–76 and their operation are more fully disclosed in FIG. 9 of the referenced application by Remmers, Ser. No. 315,147. Because the present invention uses these circuits in the same manner as that described in the prior application, a duplication of their description here has been omitted for the purposes of clarity.

Figure 7:
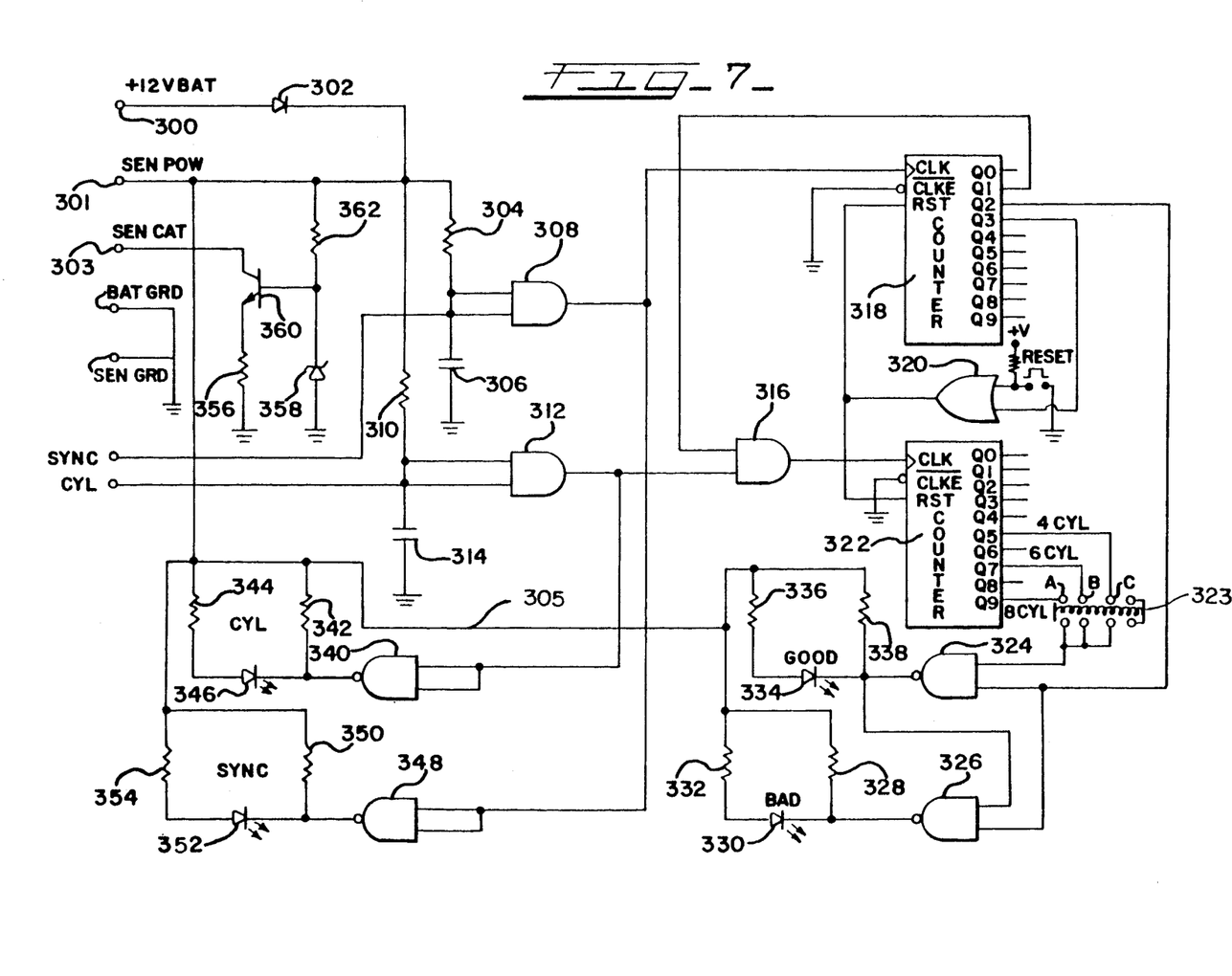
FIG. 7 is a detailed electrical schematic diagram of the test apparatus illustrated in FIG. 1.

In accordance with the present invention, the test and maintenance apparatus 48 for the opto-electronic time base generator 8 of an ignition system is shown in the detailed electrical schematic of FIG. 7. The circuit is designed for connection to the +12 volt terminal of the battery of the engine through line 300 and clip lead 53 and supplies power through the diode 302 to the circuit and to the LEDs 26, 27 and photo-transistors of the time base generator 8 through terminals 301 (SEN POW) and 303 (SEN CAT). The LEDs 26, 27 are powered on by their connection in the conductive path between the +12 volts of the battery and the emitter-collector path of an NPN transistor 360, a resistor 356, and ground. The transistor 360 regulates the current flow through the LEDs 26, 27 by having a predetermined bias voltage on its base. The bias voltage is generated by the combination of a Zener diode 358 and resistor connected between the +12 volt supply voltage and ground. The +12 volt supply line is also tied to a resistor capacitor combination 304, 306 which acts as a pulse shaping circuit to the input of an AND gate 308. In a similar manner, the +12 volt supply line is also tied to a pulse shaping resistor capacitor combination 310, 314 whose junction is tied to the input of an AND gate 312. The signal SYNC is connected to the inputs of AND gate 308 while the signal CYL is connected to the inputs of AND gate 312.

In general, the capacitors 306 and 314 charge to +12V when the SYNC and CYL signals are a high level logic. The output from AND gates 308 and 312 is respectively. When, however, the SYNC or CYL signals make a transition to a low logic level, the corresponding capacitor 306, 314 is discharged and the corresponding AND gate 308 output is a low logic level.

The output of AND gate 308 is connected to the clock input CLK of a counter 318 and to the inputs of an inverting NAND gate 348. The output of the AND gate 312 is connected to one input of AND gate 316 and to the inputs of an inverting NAND gate 340. The Q1 output of the counter 318 is connected to the other input of the AND gate 316. The $Q_3$ output of the counter 318 is connected to one input of an OR gate 320 whose output is connected to the reset inputs RST of counters 318 and 322. The clock input CLK of counter 322 is connected to the output of AND gate 316. The $Q_2$ output of counter 318 is connected to one input of a NAND gate 324 while the other input of the NAND gate 324 is connected either to the $Q_5$, $Q_7$ or $Q_9$ output of counter 322, depending upon the position of the push button switch 323. The NAND gate 324 drives the "GOOD" LED 334 by its connection between the output of the gate and the power supply line 305 through resistor 336. A resistor 338 is paralleled across this connection. The NAND gate 326 drives the "BAD" LED 330 by its connection between the output of the gate and the power supply line 305 through resistor 332. A resistor 328 is paralleled with this connection. In a similar manner, the NAND gate 340 drives the "CYL" LED 346 and NAND gate 348 drives the "SYNC" LED 352.

Operationally, if the LED and photo-transistor pairs of the opto-electronic time based generator are functioning properly, the SYNC and CYL signals cause the AND gates 308 and 312, respectively to produce digital signals at their outputs representative of the presence and absence of the corresponding slots of the encoder wheel. The SYNC waveform is applied to the clock input CLK of the counter 318 such that it will produce a $Q_1$ output enabling the AND gate 316. As each CYL pulse is generated from AND gate 312, it is transmitted through the enabled AND gate 316 to the clock input CLK of counter 322 where a total count is accumulated. Following CYL pulses are transmitted through the AND gate 316 and are likewise counted until the next SYNC pulse occurs. At that time the counter 318 produces a high level logic signal rom its $Q_2$ output enabling NAND gates 324 and 326.

If the correct number of pulses have been accumulated by counter 322 (5 for a four cylinder engine, 7 for a six cylinder engine, and 9 for an eight cylinder engine), then AND gate 324 is enabled lighting the "GOOD" LED 334. This low logic level signal from the output of NAND gate 324 further disables NAND gate 326 so the "BAD" LED is not lighted. Alternatively, if the enabling signal from the counter 322 is not applied to the input of gate 324 then gate 326 remains enabled and the "BAD" LED is lighted. Upon the next SYNC pulse, the counter 318 advances and a pulse from the $Q_3$ output flows through OR gate 320 to reset both counters and the cycle continues in this manner.

A second operation of the circuit is to provide a visual indication of the CYL and SYNC signal with LEDs 346 and 352, respectively. The output of AND gate 308 is inverted in NAND gate 348 to drive the "SYNC" LED 352 in synchronism with SYNC signal on the input of the AND gate 308. In a similar manner, the output of AND gate 312 drives the NAND gate 340 to light the "CYL" LED 346 synchronously with the CYL signal.

In a preferred embodiment, the engine may be statically timed in both the idle and wide open throttle positions, by the following method. The testing apparatus is connected as more fully set forth herein. After the connection, the engine crankshaft is rotated in a clockwise direction, either by hand, or with a stepping switch on the starter motor. The "SYNC" LED is watched until it lights about 50° BTDC of cylinder 1. Then the "CYL" LED is watched to first note the passage of the DIR slot, i.e., the "CYL" LED turns on and then off a first time. Next the CYL1 slot is determined when the "CYL" LED lights a second time upon further engine rotation. When the CYL1 indication LED turns off the second time, the engine should be at a rotation angle of the crankshaft for the nonadvanced schedule, at the trailing edge of the CYL1 slot if the timing ring is positioned correctly. The timing ring 15 can be checked for proper positioning by verifying that the arrow points to the desired static timing, in general about 18° BTDC at wide open throttle or 8° ATDC for idle. If the timing is incorrect, it can be changed by loosening an adjustable stop and moving the timing ring 15 in the proper direction, rotating the crankshaft a few degrees to verify that the light goes off at the proper angle, and then retightening the adjustable stop. This is accomplished by loosening the adjustable stop 45 and forcing the timing ring in the correct direction.

While a preferred embodiment of the invention has been illustrated, it will be obvious to those skilled in the art that various modifications and changes may be made thereto without departing from the spirit and scope of the invention as hereinafter defined in the appended claims.

What is claimed is:

1. A test apparatus for an opto-electronic time base generator of an ignition system for an internal combustion engine, the time base generator having an encoder disk which rotates synchronously with the crankshaft of the engine and includes a predetermined number of timing sections of a predetermined width which are at fixed locations relative to the crankshaft, and at least one synchronizing section which is at a fixed location relative to the crankshaft and to at least one of said timing sections and the time base generator having a photo-electric detector for detecting the presence or absence of the timing sections and the at least one synchronizing section and for generating digital signals representative thereof, said test apparatus comprising:

means for powering said photo-electric detector;

means for counting the number of the representations of timing sections of the digital signals in one or more revolutions of the encoder;

means for generating an indication of whether the result of said counting means equals the predetermined number of said timing sections;

means for generating a visual indication of a correct count responsive to the coincidence of a correct count signal and an enabling indicator count signal; and means for generating a visual indication of an incorrect count responsive to the coincidence of an incorrect count signal and said enabling indicator count signal.

2. A test apparatus for an opto-electronic time base generator of an ignition system for an internal combustion engine. the time base generator having an encoder disk which rotates synchronously with the crankshaft of the engine and includes a predetermined number of timing sections of a predetermined width which are at fixed locations relative to the crankshaft, and at least one synchronizing section which is at a fixed location relative to the crankshaft and to at least one of said timing sections and the time base generator having a photo-electric detector for detecting the presence or absence of the timing sections and the at least one synchronizing section during rotation of the encoder disk and for generating digital signals representative thereof, said test apparatus comprising:

means for independently connecting power to said photo-electric detector;

means for counting the number of the representations of timing sections of the digital signals in one or more revolutions of the encoder;

means for generating an indication of whether the result of said counting means equals the predetermined number of said timing sections;

means for generating an indication of the representations of the timing sections;

means for generating an indication of the representations of the at least one synchronizing section;

means for generating a visual indication of a correct count responsive to the coincidence of a correct count signal and an enabling indicator count signal; and     means for generating a visual indication of an incorrect count responsive to the coincidence of an incorrect count signal and said enabling indicator count signal.

* * * * *